United States Patent
Eimann et al.

(10) Patent No.: US 7,433,752 B2
(45) Date of Patent: Oct. 7, 2008

(54) DEVICE AND METHOD FOR AUTOMATIC GENERATION OF CONTROL INSTRUCTIONS FOR ROTARY MACHINES

(75) Inventors: Peter Eimann, Schwabenheim (DE); Patrick Johannes, Partenheim (DE); Felix Petry, Mainz Bretzengeim (DE); Hartmut Eggert, Ober-Olm (DE); Peter Woerner, Saulheim (DE); Matthias Bicker, Mainz/Finthen (DE)

(73) Assignee: Schott AG, Mainz (DE)

( * ) Notice: Subject to any disclaimer, the term of this patent is extended or adjusted under 35 U.S.C. 154(b) by 7 days.

(21) Appl. No.: 11/391,172

(22) Filed: Mar. 28, 2006

(65) Prior Publication Data

US 2006/0224257 A1    Oct. 5, 2006

(30) Foreign Application Priority Data

Mar. 31, 2005    (DE) .................. 10 2005 015 063

(51) Int. Cl.
*G06F 19/00* (2006.01)
(52) U.S. Cl. .................. 700/123; 427/248; 118/624
(58) Field of Classification Search .................. 700/159, 700/116, 123, 119–120, 176, 83, 17; 427/248.1, 427/569; 415/1; 148/98–714; 205/82, 84; 118/624, 696

See application file for complete search history.

(56) References Cited

U.S. PATENT DOCUMENTS

| | | | | |
|---|---|---|---|---|
| 5,357,450 | A * | 10/1994 | Hemmerle et al. | 700/176 |
| 7,025,559 | B2 * | 4/2006 | Loy et al. | 415/1 |
| 2005/0092772 | A1 * | 5/2005 | Miller et al. | 222/135 |
| 2006/0099340 | A1 * | 5/2006 | Behle et al. | 427/248.1 |
| 2006/0110483 | A1 * | 5/2006 | Damerow et al. | 425/1 |

FOREIGN PATENT DOCUMENTS

| | | |
|---|---|---|
| DE | 199 11 294 C1 | 6/2000 |
| DE | 102 31 345 A1 | 10/2003 |

* cited by examiner

*Primary Examiner*—Kidest Bahta
(74) *Attorney, Agent, or Firm*—Michael J. Striker

(57) ABSTRACT

The controller and method of the invention generate control instructions for a rotary machine that coats bottles. Gas is supplied to processing stations holding the bottles via a pressure management system. The processing stations are centrally controlled by a programmable PLC or microcontroller with an input device and display terminal. Since rotary machines need to be controlled differently depending on the type of bottles and the type of coating, different programs should be interactively created using the input device and display terminal, which then control the individual components of the rotary machine and the processing stations during the coating process. This eliminates unnecessary errors resulting from preparation of the different programs individually by a normal user.

21 Claims, 4 Drawing Sheets

DEVICE AND METHOD FOR AUTOMATIC GENERATION OF CONTROL INSTRUCTIONS FOR ROTARY MACHINES

BACKGROUND OF THE INVENTION

1. The Field of the Invention

The invention relates to a device and a method for generating control instructions for a rotary machine, where processing stations are located on a rotary machine, the rotary machine comprises an input and a display terminal. In particular, the invention relates to a system for generating machine codes for PLC (programmable logic controller) and microcontrollers which control a rotary machine and its components.

2. Related Art

Rotary machines such as those to be controlled by the present invention are used in wide range of applications. The rotary machine shown in FIG. 1 is used for coating bottles, especially plastic bottles, with the aid of plasma. The surface of the bottle is coated and the barrier property of the surface is thereby modified. Other applications are feasible. In the rotary machine, process stations rotate about a central point and contain bottles. Different process steps are executed depending on the rotational position, as can be seen clearly from the Fig.s.

When this device is used for different types of bottles, the control of the machines needs to be modified. As a result of the complex PLC control and the microcontroller control, it is unreasonable for a user to produce programs manually.

Known programming tools for machine and PLC do not take into account the needs of the user but primarily have the aim of re-using components which have already been used. Consequently, they are directed towards the developers of programs for PLC. Thus, it is feasible that modules are produced which are then incorporated again at a later point in the form of a library. However, this approach does not solve the said problems since it is unreasonable for the user to work at such a low programming level.

SUMMARY OF THE INVENTION

It is the object of the invention to provide a device and a method which, by an interactive input of information, makes it possible to automatically generate a control program which allows the rotary machine to be driven.

This object is solved by the invention having the features of the independent claims. Advantageous further developments of the invention are characterised in the dependent claims.

In detail, the invention relates to a device and a method for generating control instructions for a rotary machine, wherein processing stations are disposed on a rotary machine. In the preferred embodiment, the processing stations have holders for receiving bottles. Furthermore, gas is supplied via the processing stations and via the pressure management system. The processing stations can be controlled centrally by a PLC, by respectively one separate PLC or by specific microcontrollers. Said components can be programmed by code instructions. A further component of the device is an input and display terminal by which means the programs are created interactively. This is preferably a laptop with a windowed interface such as Windows®. Since rotary machines need to be controlled differently depending on the type of bottles and the type of coating, different programs should be created which then control the individual components of the rotary machine and the processing stations. As a result of the complexity of the control instructions and the associated liability to error in the programming, it is unreasonable for a normal user to create such a program which is generally based on a recipe.

The invention consequently provides a system which allows the user to create a program code for controlling a rotary machine by means of structured menu guidance.

In this case, in a first menu level a segment is defined on the rotary machine using circumferential position parameters. The circumferential parameters can be numbers of degrees, centimeters on the circumferential circle or other equivalent values. In the preferred embodiment these are numbers of degrees. Thus, a plurality of segments can be defined on the rotary machine in which specific functions are then controlled.

The functions of the rotary machine or the processing stations are determined in a second menu level which has a reference to the definition of the segment in the first menu level. Thus, the circular orbit can be divided into logical segments within which functions are controlled. The functions are selected interactively and selectively by means of a mask so that the functions within the logical segment are controlled. Control instructions in the form of a control code are generated on the basis of the logical segmentation thus described and are then transferred to the machine.

In the preferred embodiment the segments are defined by numbers of degrees and thereby delimited with respect to one another. The execution of the segments can likewise be determined within the segments by numbers of degrees which are then added as DELTA to the beginnings of the segments and determine the start or stop of the function.

Alternatively, the start or the end of the function within the segment can be determined by a time definition such as, for example, a delay. This time unit indicates, for example that the function measured from the time of passing through the logical segment is switched on or off or activated for a certain time unit, the latter being determined directly from the rotational speed.

Furthermore, desired values, warning values and error values for sensors can be specified within a segment. These data can also be specified globally and used for quality determination, especially for determining the rejects and thus serve as the basis for all segments, where the more specific information in the segment has the higher priority. These are for example the global machine control parameters: speed, desired parameters, warning values, error values.

In the preferred embodiment for the coating of bottles, for example, the local functions (within the logical segment) and the global functions can be as follows: valve control, valve monitoring, pump control, pump monitoring, microwave control, microwave monitoring, temperature monitoring, temperature control, plasma control, plasma monitoring, gas control, gas monitoring. Other functions are naturally feasible and are obtained depending on the use of the rotary machine.

After the parameters have now been entered in a structured fashion, these can either be saved as packaged parameter combinations or as finished codes. The code is generated on the basis of a machine code template, also called a template. This is generally provided with macro-instructions which are generally replaced by a macro-editor before the scan and parser process. The code thus prepared is either interpreted on the rotary machine or it is compiled further before it is transferred to the machine. However, it is feasible that instructions are modified in the compiled code using a special macro-program identification. However, this approach is associated with a greater effort because of the possible address relocations/translation.

After creating the code, this can be transferred to the machine and the individual controllers.

All these preparatory activities as far as completion of the program code for the rotary machine and the individual processing stations are preferably carried out on a PC or laptop. The program fragments thus produced and code instructions can then be transferred via a network connection such as a telephone network for example.

BRIEF DESCRIPTION OF THE DRAWINGS

The invention is explained in detail hereinafter with reference to exemplary embodiments shown schematically in the Figs. The same reference numbers in the individual Figs refer to the same elements. In detail in the Figs:

FIG. 3 is a screen shot of the global parameter mask;

FIG. 4 is a screen shot of a segment parameter mask.

DESCRIPTION OF THE PREFERRED EMBODIMENT

Figure 1:
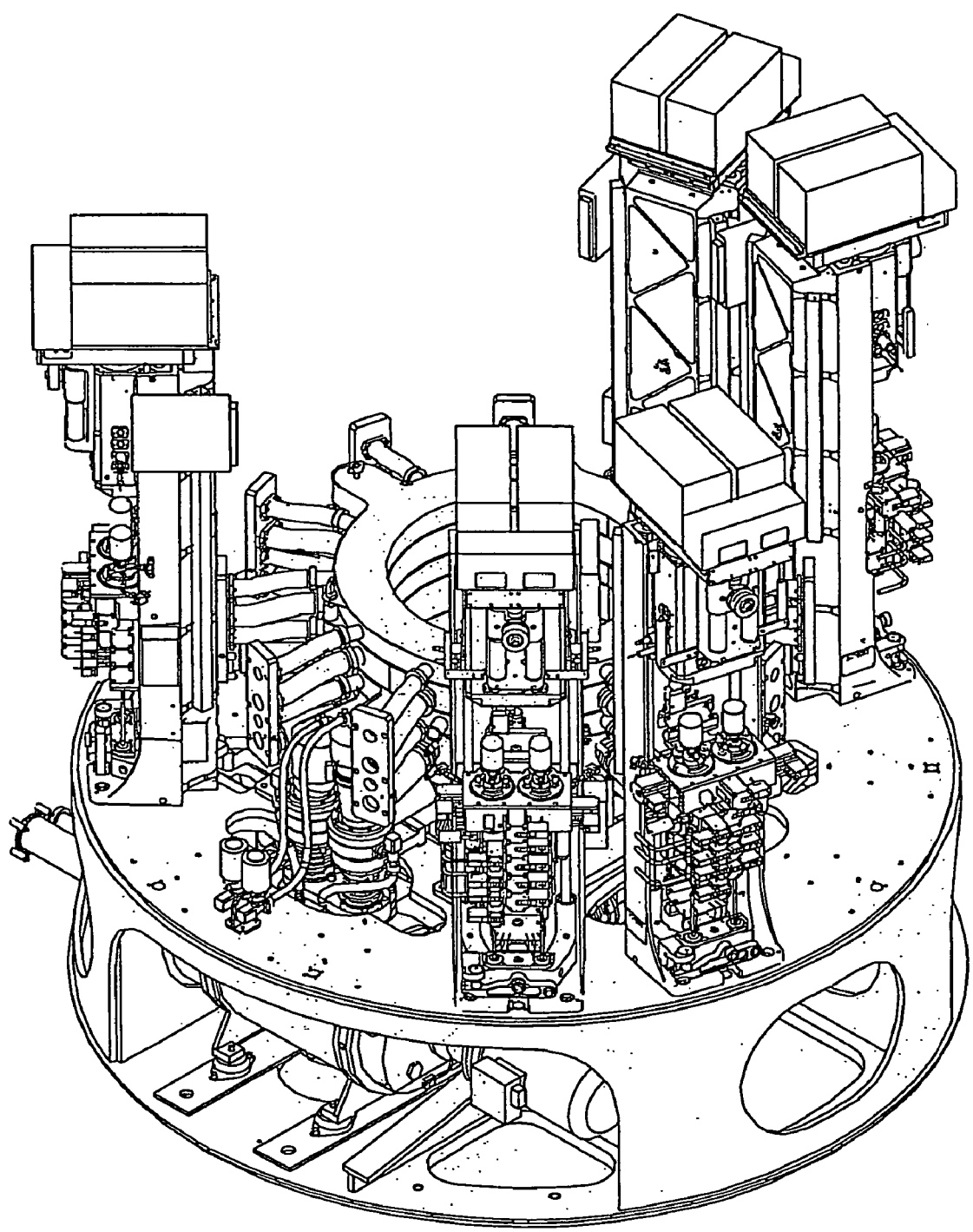
FIG. 1 is a perspective schematic view of a rotary machine with processing stations where not all the processing stations are installed.
Figure 2:
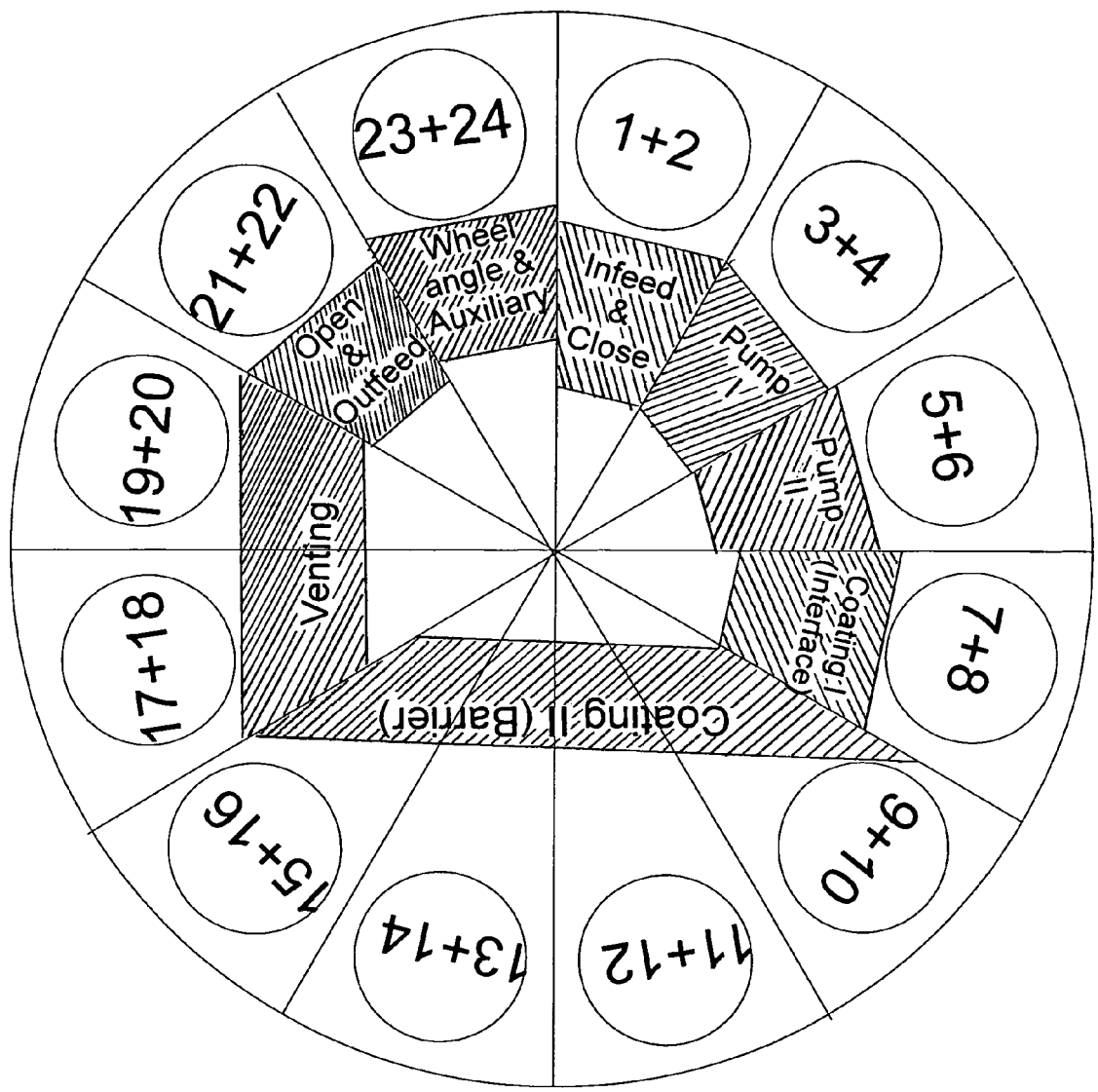
FIG. 2 is a schematic diagram of a logical segmentation of a rotary machine.

In one possible embodiment as shown in FIGS. 1 and 2, a rotary coating system 31 comprises twelve processing stations 32 or twelve chambers. The chambers 32 (double reactors) are each provided with respectively two MW generators 33.

The segmentation takes place so that two chambers are always in the coating phase (17, 18, 19, 20) for the adhesion promoter. Four chambers (9, 10, 11, 12, 13, 14, 15, 16) are always in the coating phase for the barrier. In the other segments (21, 22, 1, 2) the bottles are transferred to the machine or leave the machine. In other segments again pump functions are controlled (3, 4, 5, 6). These are connected to the gas generator by means of a ring main. Said gas generator is supplied by a precursor storage container. There is provided a principal evacuating plant to which each reactor is connected via a manifold. The pressure is regulated centrally at the manifold for the adhesion promoter and barrier respectively (see FIG. 3).

Figure 3:
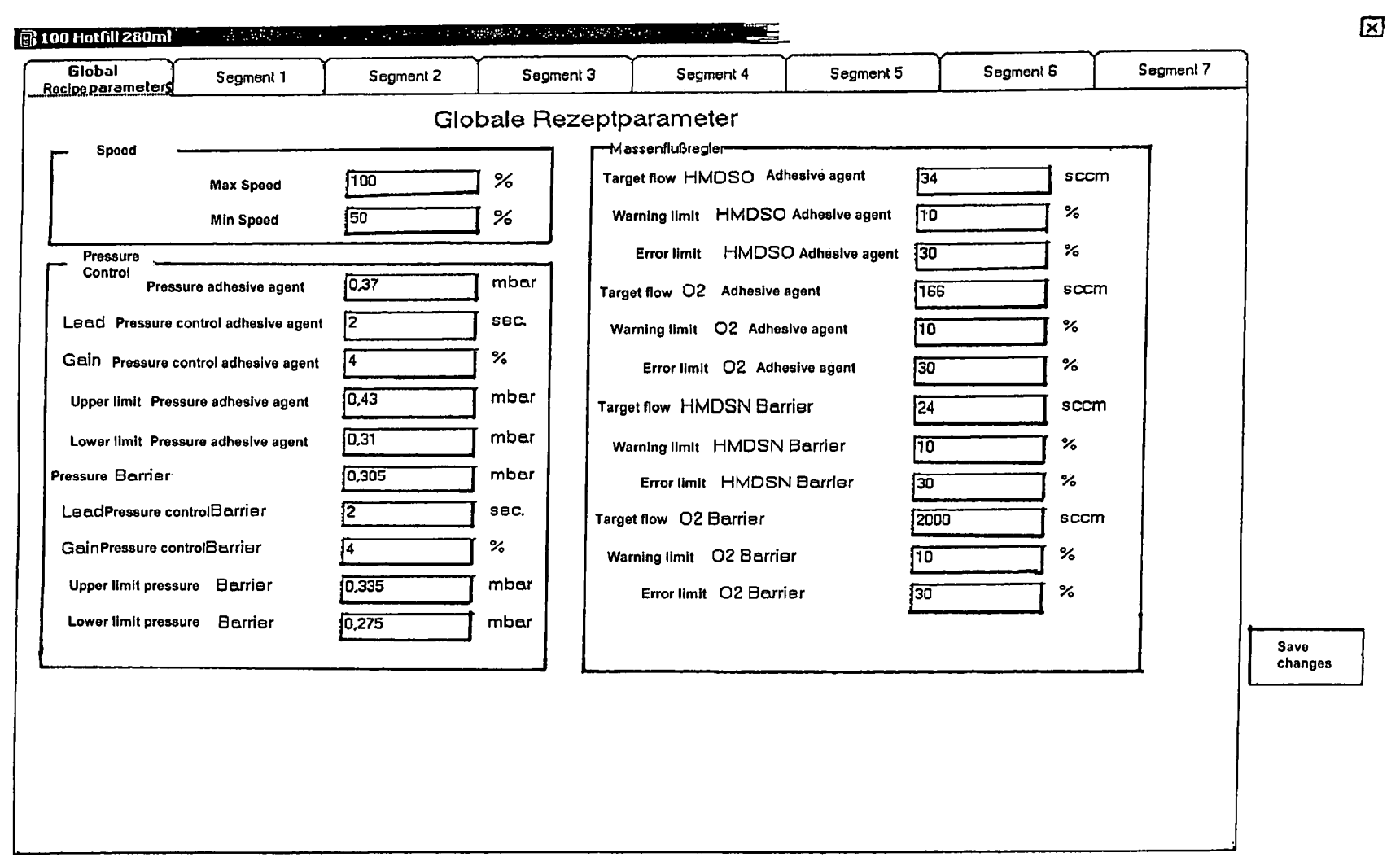

FIG. 3 shows the adjustment of global recipe parameters; there comprise regulating speed and mass flow regulation. The descriptions are self-explanatory so that no further comment need be made on this with reference to FIG. 1.

Figure 4:
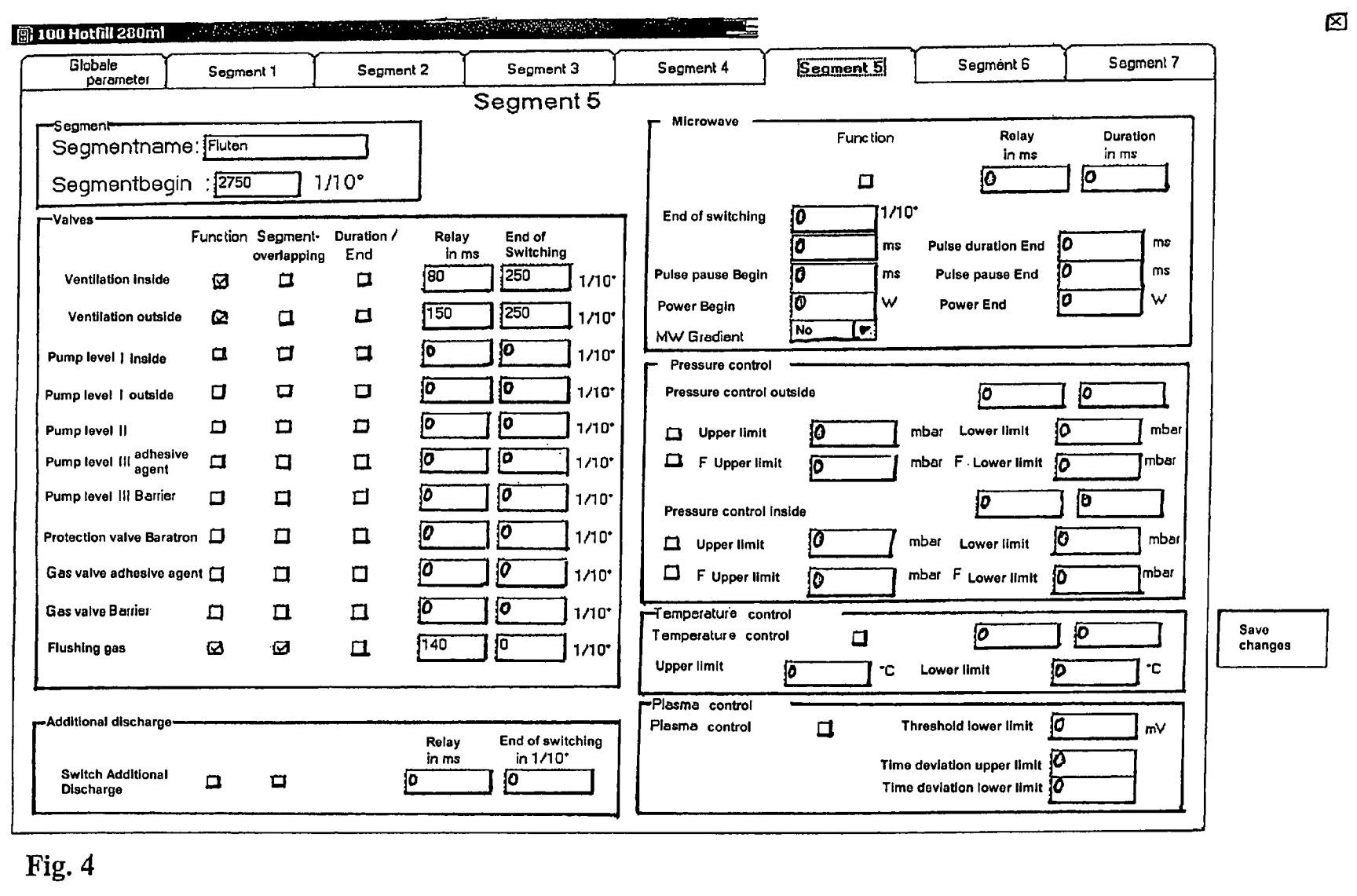

FIG. 4 shows the control in a fifth segment which comprises the flooding segment (17, 18, 19, 20) in relation to FIG. 2. This segment begins at 275 degrees. The functions internal aeration and external aeration are activated and begin with a delay of 80 ms or 150 ms respectively and end after 25 degrees relative to the beginning of the segment. Flushing gas is then pumped in, this being initiated after a delay of 140 ms and also being initiated so that it covers the segments. Since this involves the end of the segment, the flushing is stopped at the latest when the bottle is ejected.

The scope of protection is determined by the following claims and it is not intended to be limited by the description.

The invention claimed is:

1. A method of automatically generating control instructions for at least one controller that controls components of a rotary machine that coats bottles, said rotary machine comprising processing stations arranged to rotate around a central point, the at least one controller that controls said components of said rotary machine, at least one programmable computer that generates said control instructions for said at least one controller, and an input and display device connected with the at least one programmable computer;

wherein said processing stations comprise holders for said bottles and comprise means for performing process steps to coat said bottles according to circumferential positions of said processing stations about said central point;

wherein said method comprises the steps of:

a) defining respective segments distributed circumferentially around the rotary machine with corresponding circumferential position parameters in a first menu level of the at least one programmable computer;

b) determining corresponding functions of the rotary machine or the processing stations required to control said process steps for coating said bottles within said respective segments in a second menu level of the at least one programmable computer, with reference to the respective segments defined in the first menu level, wherein the corresponding functions associated with the respective segments are selected interactively and selectively by means of the input and display device connected with the at least one programmable computer; and c) automatically generating said control instructions in the form of a control code in the at least one programmable computer for said process steps performed in the respective segments from on the basis of the corresponding functions interactively selected by means of the input and display device in step b);

wherein said control code is a machine code in which said position parameters and machine control parameters of the corresponding functions entered interactively via the menu levels are automatically input and the machine code is automatically generated from a machine code template and said parameters; and wherein said corresponding functions comprise gas monitoring, gas control, valve control, valve monitoring, plasma control, plasma monitoring, microwave control, microwave monitoring, temperature monitoring and temperature control.

2. The method according to claim 1, wherein said respective segments are defined and delimited by said corresponding circumferential position parameters in degrees and execution of said corresponding functions within said respective segments is determined by angular position parameters in said degrees.

3. The method according to claim 2, wherein each of said corresponding functions is controlled within said respective segments according to other circumferential position parameters that define a beginning of said function and an end of said function within said respective segments.

4. The method according to claim 1, wherein said control instructions include instructions for time delays for triggering individual functions within the respective segments.

5. The method according to claim 1, further comprising defining desired values, warning values and error values for sensors within said respective segments and said sensors comprise means for detecting rejects.

6. The method according to claim 1, wherein the machine code template is a code template that is provided with said machine control parameters by macro-definitions of the machine control parameters.

7. The method according to claim 1, further comprising transferring said control code from said at least one programmable computer to said at least one controller for operation of said rotary machine according to said control code.

8. The method according to claim 1, wherein said at least one controller comprises said at least one programmable computer.

9. A rotary machine for coating bottles, said rotary machine comprising processing stations arranged to rotate around a central point, at least one controller that controls components of the rotary machine, at least one programmable computer for generating control instructions for said at least one controller, and an input and display device connected with the at least one programmable computer;
- wherein said processing stations comprise holders for said bottles and means for performing process steps to coat said bottles according to circumferential positions of said processing stations about said central point; and
- wherein said at least one programmable computer comprises:
- means for defining respective segments distributed circumferentially around the rotary machine with corresponding circumferential position parameters in a first menu level of the at least one programmable computer;
- means for determining corresponding functions of the rotary machine or the processing stations required to control said process steps for coating said bottles within said respective segments in a second menu level, with reference to the respective segments defined in the first menu level of the at least one controller, wherein the corresponding functions associated with the respective segments are selected interactively and selectively by means of the input and display device connected with the at least one programmable computer; and
- means for automatically generating said control instructions in the form of a control code in the at least one programmable computer for said process steps performed in the respective segments on the basis of the corresponding functions interactively selected by means of the input and display device;
- wherein said control code is a machine code in which said position parameters and machine parameters of the corresponding functions entered interactively via the menu levels are automatically input and the machine code is automatically generated from a machine code template; and
- wherein said corresponding functions comprise gas monitoring, gas control, valve control, valve monitoring, plasma control, plasma monitoring, microwave control, microwave monitoring, temperature monitoring and temperature control.

10. The rotary machine according to claim 9, further comprising means for defining and delimiting said respective segments by said corresponding circumferential position parameters in degrees and said corresponding functions within said respective segments by other circumferential position parameters in said degrees.

11. The rotary machine according to claim 9, further comprising means for determining initial circumferential positions in degrees corresponding to the beginnings of the respective segments and means for determining ending circumferential positions in degrees corresponding to the endings of the respective segments.

12. The rotary machine according to claim 9, further comprising means for specifying time delays for individual functions within the respective segments.

13. The rotary machine according to claim 9, comprising means for specifying upper limits and lower limits of sensor values of sensors and wherein said sensors comprise means for checking the bottles within said respective segments for rejects.

14. The rotary machine according to claim 9, comprising means for specifying global machine control parameters valid for all of said respective segments.

15. The rotary machine according to claim 14, wherein the global machine control parameters are at least one of speed values, desired values, desired ranges, warning values and error values.

16. The rotary machine according to claim 14, wherein the respective segments are each defined by an initial value of the circumferential position parameter in degrees.

17. The rotary machine according to the claim 9, further comprising means for online transmission of said control instructions from said at least one programmable computer to the at least one controller of the rotary machine or the processing stations.

18. The processing station according to the claim 9, wherein said at least one controller comprises a programmable logic controller or a plurality of microcontrollers for the components of the rotary machine.

19. The rotary machine according to the claim 9, wherein the machine code template is a code template that is provided with said machine parameters by macro-definitions.

20. The rotary machine according to claim 9, wherein said at least one controller comprises said at least one programmable computer.

21. The rotary machine according to claim 20, wherein the respective segments are displayed on individual screen pages of the input and display device.

\* \* \* \* \*